(12) United States Patent
Rosenberg et al.

(10) Patent No.: US 10,017,885 B2
(45) Date of Patent: Jul. 10, 2018

(54) METHOD AND AN APPARATUS FOR MAKING MINERAL FIBRE PRODUCTS

(71) Applicant: Rockwool International A/S, Hedehusene (DK)

(72) Inventors: Gorm Rosenberg, Gadstrup (DK); Christian Westerberg, Køge (DK)

(73) Assignee: Rockwool International A/S, Hedehusene (DK)

( * ) Notice: Subject to any disclaimer, the term of this patent is extended or adjusted under 35 U.S.C. 154(b) by 248 days.

(21) Appl. No.: 14/648,793

(22) PCT Filed: Dec. 5, 2013

(86) PCT No.: PCT/EP2013/075605
§ 371 (c)(1),
(2) Date: Jun. 1, 2015

(87) PCT Pub. No.: WO2014/090669
PCT Pub. Date: Jun. 19, 2014

(65) Prior Publication Data
US 2015/0315731 A1    Nov. 5, 2015

(30) Foreign Application Priority Data
Dec. 11, 2012 (EP) .................................. 12196407

(51) Int. Cl.
*B32B 37/00* (2006.01)
*B32B 37/20* (2006.01)
(Continued)

(52) U.S. Cl.
CPC ....... *D04H 1/4218* (2013.01); *B32B 37/0046* (2013.01); *B32B 37/20* (2013.01);
(Continued)

(58) Field of Classification Search
CPC ..... B32B 37/0046; B32B 37/20; B32B 38/04; D04H 1/4218; D04H 1/4226; Y10T 156/1059; Y10T 83/2087
See application file for complete search history.

(56) References Cited

U.S. PATENT DOCUMENTS

| 5,121,885 A * | 6/1992 | Chipman | ............... B26D 1/035 |
| | | | 242/525.1 |
| 2001/0006716 A1* | 7/2001 | Brandt | ................ D04H 1/4209 |
| | | | 428/113 |

FOREIGN PATENT DOCUMENTS

| WO | 9520708 A1 | 8/1995 |
| WO | 2008155401 A1 | 12/2008 |

OTHER PUBLICATIONS

International Search Report and Written Opinion for PCT/EP2013/075605, dated Jan. 28, 2014.

* cited by examiner

*Primary Examiner* — Mark A Osele
*Assistant Examiner* — Christopher C Caillouet
(74) *Attorney, Agent, or Firm* — Dinsmore & Shohl LLP

(57) ABSTRACT

The present invention concerns a method and an apparatus for making mineral fibre products by splitting an incoming primary web, said apparatus comprising a feeding conveyor for providing an incoming primary web of air-laid mineral wool, said feeding conveyor having a first direction of travel; a station for shifting the direction of travel of the primary web by receiving the primary web on a turning table and then transferring the primary web onto a receiving conveyor, where said receiving conveyor has a second direction of travel different to the first direction of travel; wherein a web splitter is provided at the downstream end of said receiving conveyor for dividing the incoming primary web into a first primary web and second primary web and (Continued)

wherein the turning table is shiftable in the first direction of travel.

10 Claims, 4 Drawing Sheets

(51) Int. Cl.
  *B32B 38/04* (2006.01)
  *D04H 1/4218* (2012.01)
  *D04H 1/4226* (2012.01)
(52) U.S. Cl.
  CPC ............ *B32B 38/04* (2013.01); *D04H 1/4226* (2013.01); *B32B 2038/045* (2013.01); *Y10T 83/0467* (2015.04); *Y10T 83/2087* (2015.04); *Y10T 156/1059* (2015.01)

METHOD AND AN APPARATUS FOR MAKING MINERAL FIBRE PRODUCTS

CROSS-REFERENCE TO RELATED APPLICATIONS

This application is the U.S. National Phase of PCT/EP2013/075605 filed Dec. 5, 2013, which claims priority of European Patent Application 12196407.6 filed Dec. 11, 2012.

The present invention relates to a method and an apparatus for making mineral fibre products, wherein the apparatus comprises a feeding conveyor for providing an incoming primary web of air-laid mineral wool, said feeding conveyor having a first direction of travel, and a station for shifting the direction of travel of the primary web by receiving the primary web on a turning table and then transferring the primary web onto a receiving conveyor, where said receiving conveyor has a second direction of travel different to the first direction of travel.

As described in e.g. WO 95/20708 and WO 2008/155401 it is well known to form a primary web of mineral fibres which are produced from a melt of mineral material. This primary web is transferred over a turning station and fed into a pair of pendulum conveyors which cross-lap the primary web to form a secondary web which is then processed further. During this transfer in the turning station the direction of travel of the primary web is changed. The manufacturing process steps for producing a mineral wool product on a production line are described in detail in e.g. WO 95/20708 and WO 2008/155401.

In WO 95/20708 there is described an embodiment where a segment layer is separated from the mineral fibre primary web by providing a rotating circular knife downstream of the turning station. In another embodiment in WO 95/20708 the primary web is split into two primary webs by a horizontal knife.

In WO 2008/155401 there is described an embodiment where a cover layer is separated from the secondary web after the compression of the web in a "peel off" like manner, i.e. splitting the web in the thickness direction. The separated segment layer is then later re-joined with the mineral fibre web to form a multi-layered product, such as a sandwich or dual density product.

However, this splitting of the primary web in the horizontal direction is difficult to control in practice, since the primary web is often thin and quite uneven in its structure and density. A vertical split is therefore preferable, but apart from disclosing a circular knife the prior art is silent about how to operate it in order to optimise production on two production lines.

It is therefore an object of the present invention to provide a method and an apparatus which improves on the drawbacks of the prior art.

In a first aspect of the invention, there is provided a method of making mineral fibre products, comprising the steps of providing an incoming primary web of mineral wool; dividing the incoming primary web longitudinally into a first primary web and a second primary web for feeding a first production line and a second production line; and adjusting the width of the first and second primary webs during the production in accordance with production demand on said first and second production lines.

In a second aspect of the invention, there is provided an apparatus for making mineral fibre products by splitting an incoming primary web, said apparatus comprising a feeding conveyor for providing an incoming primary web of air-laid mineral wool, said feeding conveyor having a first direction of travel; a station for shifting the direction of travel of the primary web by receiving the primary web on a turning table and then transferring the primary web onto a receiving conveyor, where said receiving conveyor has a second direction of travel different from the first direction of travel; wherein the station comprises a receiving conveyor, wherein the turning table is shiftable in the first direction of travel; and wherein web splitter is provided at the downstream end of said receiving conveyor for dividing the incoming primary web into a first primary web and second primary web, respectively.

By providing a longitudinal mass split of the primary web it is realised that one incoming primary web can be split into two primary webs which may then be fed to each their production line for the manufacture of two separate products or two layers in a dual layered product by re-joining the two products at a suitable point down the production line.

This possibility of adjustably distributing mineral fibre material between two production lines provides a mineral wool product manufacturer with great benefits in particular when starting up the production line or changing the product type produced on the production lines. By being able to adjustably split the mineral fibre supply to each of the production lines, the manufacturing speed on different sections of each of the production lines may be controlled individually to ensure no—or only very little—material go to waste. This in turn allows for a more efficient and cost-effective manufacturing process.

By adjustment of the split of the web during manufacturing, it is possible to increase the production on one production line and decrease another with a constant supply of primary web. The amount of material supplied in the incoming primary web is determined by the capacity of the furnace melting the mineral material.

A problem associated with producing multi-layered products is that the top layer and the core layer require different processing before they are re-joined. In a continuous production process this presents a challenge due to the different timings of the processing steps on the two production lines. To avoid producing vast amounts of waste intermediate storage facilities may be provided on one or both production lines. In order to compensate for the different processing steps and the timings of the processes and in order to avoid having to have a high intermediate storage capacity, it is found advantageous by the invention that the supply of primary web to the two production lines can be adjusted during the production for different stages of the production cycle.

In the preferred embodiment, the step of sideway adjusting the primary web is in such manner that the first and second primary webs, directly after division, are fed to a fixed first primary web conveyor at the first production line and to a fixed second primary web conveyor at the second production line, respectively.

In particular, the sideway adjusting of the primary web includes a turning table and a receiving conveyor that are sideways adjustable in relation to the fixed first primary web conveyor and the fixed second primary web conveyor, respectively.

By the invention, the dividing of the primary web is performed in a station for shifting the direction of travel of the primary web by receiving the primary web on a turning table and then transferring the primary web onto the receiving conveyor, where the receiving conveyor has a second direction of travel different from the first direction of travel.

The division of the primary web is preferably carried out by a web splitter provided at the downstream end of said receiving conveyor for dividing the incoming primary web into a first primary web and second primary web wherein the turning table is shiftable in the first direction of travel.

In a preferred embodiment of the invention, said first and second primary webs are conveyed into a first pendulum conveyor and a second pendulum conveyor, respectively, on each of the production lines.

In a preferred embodiment of the invention a base layer is produced on the first production line and a top layer is produced on the second production line. Furthermore, the base layer and the top layer are preferably joined together in a dual density product produced by running the two mineral fibre production lines in parallel.

Accordingly, the first production line producing the base layer preferably includes curing the first web and, optionally, changing the fibre orientation on the first web. After the first production line producing a cured base layer and the second production line producing an uncured top layer, the cured base layer and the uncured top layer are joined to a laminated product and then this laminated product is cured.

According to an embodiment of the invention, the method comprises the step of controlling the division and thereby controlling mass distribution of mineral fibre material between the first and second primary webs in the station in accordance with the demand for mineral fibre material on the two production lines.

According to a preferred embodiment of the invention, the turning table is provided with an oblique transfer end relative to the first direction of travel. In particular, the turning table preferably comprises a moveable frame comprising an entry conveyor band or entry rollers for receiving the incoming primary web from the feeding conveyor followed by a series of rollers and wherein said series of rollers are defining the oblique downstream end. By shifting the turning table in the first direction of travel the lateral position of the primary web on the receiving conveyor, when the web is transferred onto the receiving conveyor below said turning table, can be adjusted.

Preferably, second direction of travel is substantially perpendicular to the first direction of travel. Moreover, the first and second primary webs are transferred into opposite directions on the station on a first and second transport conveyor, respectively, where one of said first and second primary webs are transferred to the second direction of travel. In particular, the directions of travel of the first and second transport conveyor are in opposite directions, preferably both substantially perpendicular to the first direction of travel.

In the following the invention is described in more detail with reference to the accompanying drawings, in which.

Figure 1:
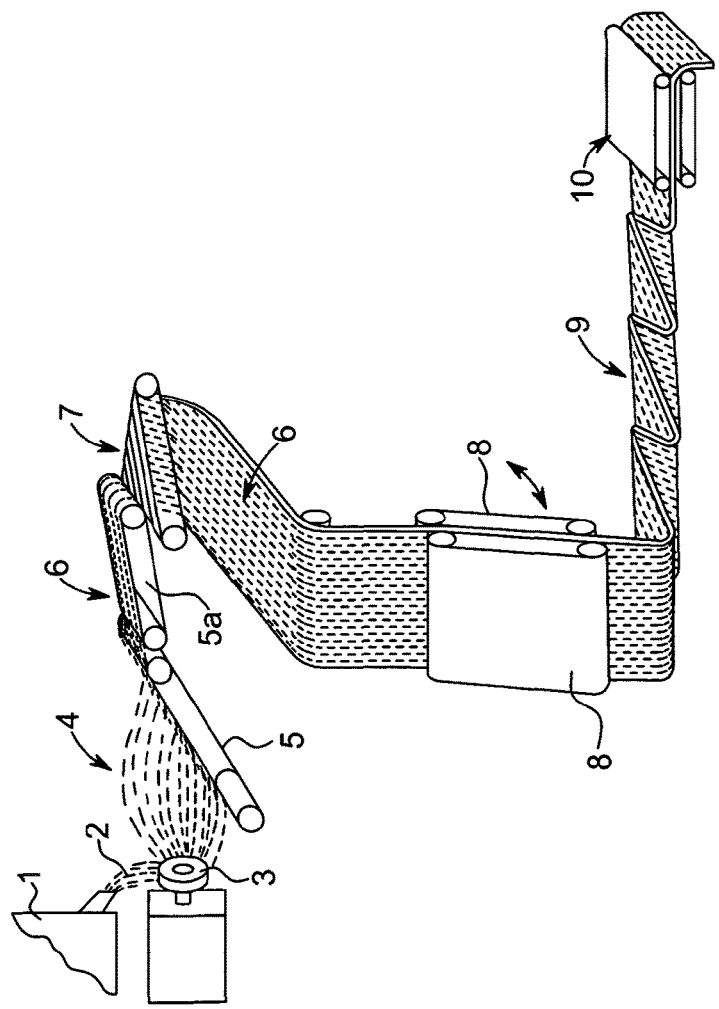
FIG. 1 is a schematic illustration of a process of making a mineral fibre product according to the prior art.

A process according to the prior art illustrating the context in which the method and apparatus according to the present invention pertains is described below with reference to FIG. 1.

Mineral material is melted in an oven 1. The mineral melt 2 is fiberised by a spinning device 3 and the fibres 4 are collected on a permeable conveyor 5 as an air-laid primary web 6. The air-laid primary web 6 is passed on a feeding conveyor 5a to a turning table 7 and from there fed to a pair of pendulum conveyors 8 which cross-lap the web 6 to form a cross-lapped secondary web 9. The cross-lapped secondary web 9 is then passed through further processing stations 10.

Figure 2:
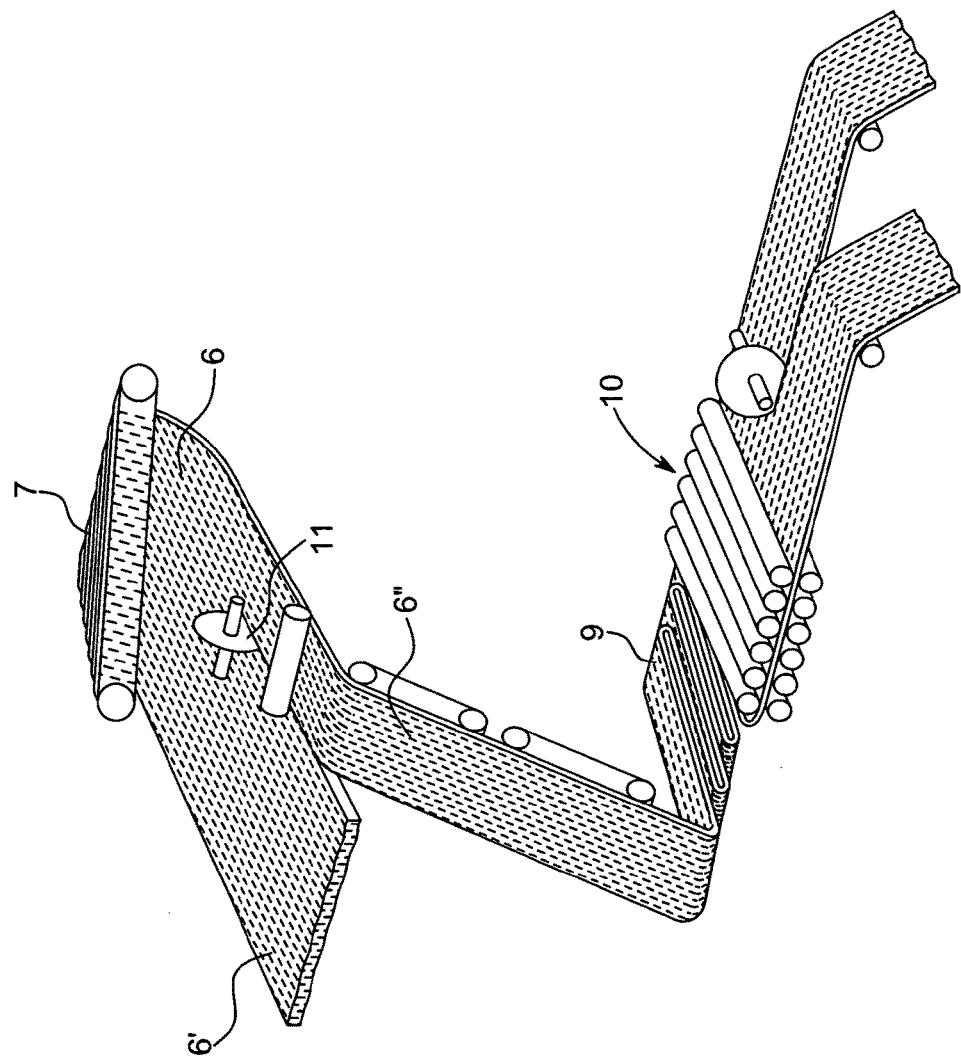
FIG. 2 is an embodiment thereof.

As shown in FIG. 2, it is known to provide a circular knife 11 which cuts the primary web 6 in the longitudinal direction, i.e. in the direction of travel of the primary web to separate the primary web 6 into two adjacent webs 6' and 6" for producing a dual density product with a base layer of the web 6' and a covering top layer of the web 6".

Figure 3:
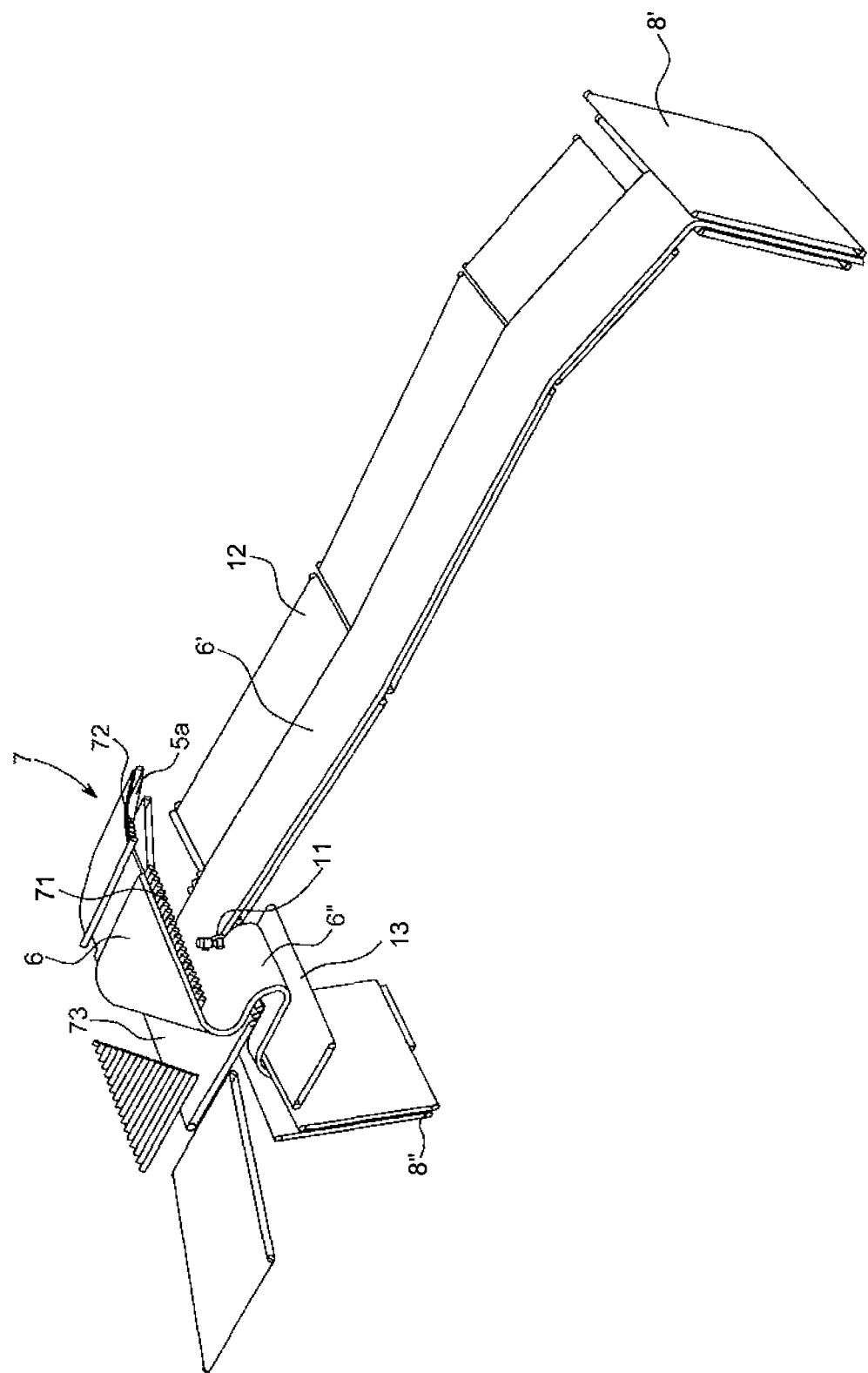
FIG. 3 is a schematic perspective view of an embodiment of the invention.
Figure 4:
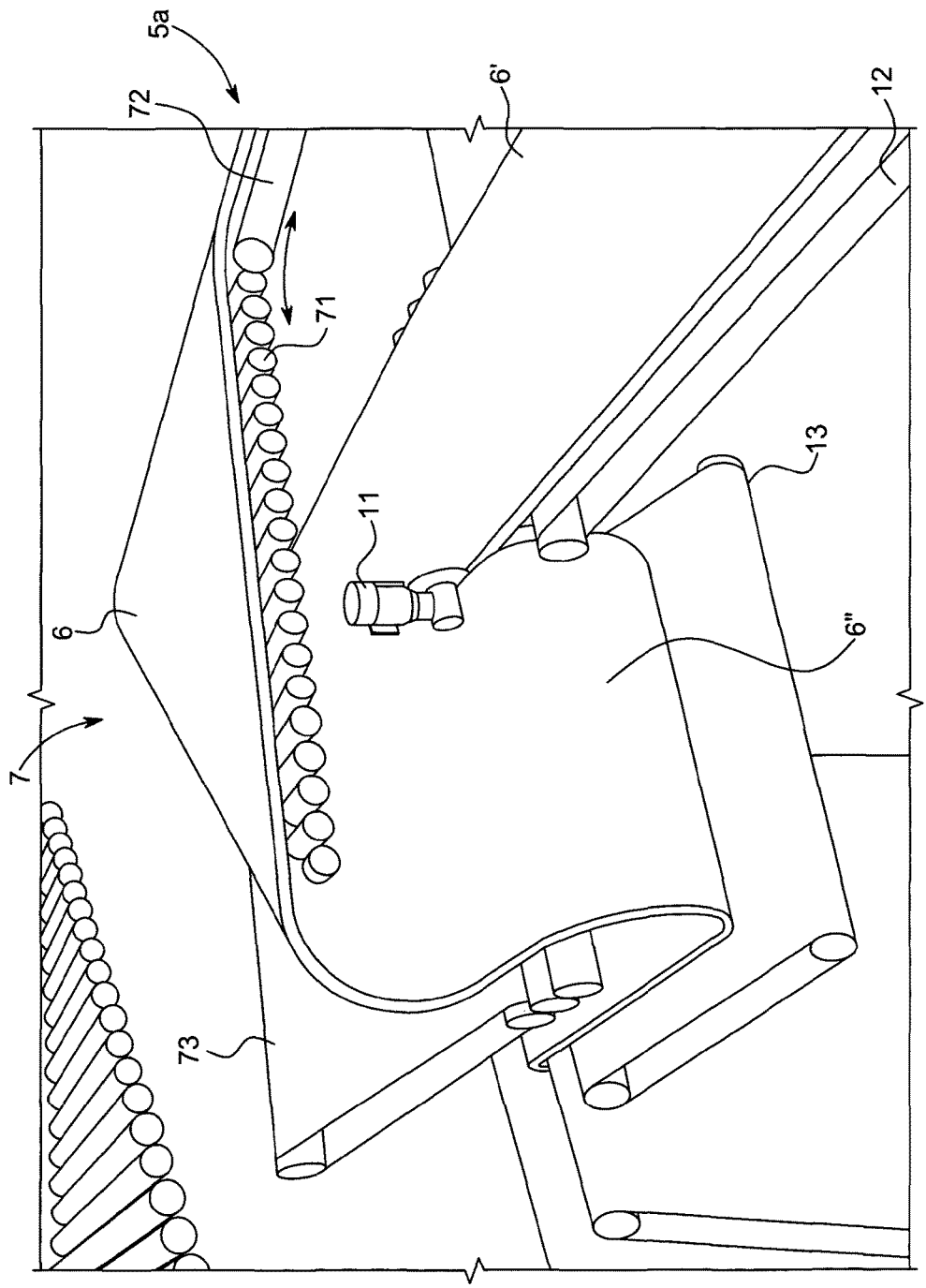
FIG. 4 is a detailed view of the embodiment of the invention.

In FIGS. 3 and 4, an embodiment of the invention is shown. The primary web 6 is transferred via a feeding conveyor 5a onto the transfer station 7 comprising an entry conveyor belt 72 receiving the incoming primary web 6 with a first direction of travel. From this entry conveyor 72 the web 6 is passed on to a series of rollers in a roller conveyor 71 which are provided with an oblique ending whereby the web 6 falls from the roller conveyor 71 and down onto an underlying receiving conveyor 73, which has a second direction of travel substantially perpendicular to the first direction of travel of the primary web 6.

The roller conveyor 71 is made of a series of rollers which are gradually shorter towards the end of the conveyor 71 and aligned at one side so that the ending of the conveyor run of the web is oblique or slanted whereby the web 6 changes direction.

At the downstream end of the receiving conveyor 73 a rotating cutting device 11 is provided splitting the primary web 6 into two sections, a first primary web 6' and a second primary web 6". In the turning station 7, the entry conveyor 72 and the roller conveyor 71 are preferably mounted in a frame or the like (not shown) and are moveable in the first direction of travel of the primary web 6 as indicated by the arrow in FIG. 4. Hereby the point at which the primary web 6 "falls" off the rollers 71 is shifted and the lateral position of the primary web 6 on the underlying receiving conveyor 73 is thereby shifted. Consequently, this means that the width of the first primary web 6' is changed relative to the second primary web 6".

After the splitting by the cutting device, the first and second primary webs 6', 6" are transferred onto transport conveyors 12, 13 and fed into a first and a second pendulum pair of conveyors 8', 8" for being cross-laid as secondary webs on each their production line (not shown).

By moving this turning table 7 backward and forwards the amount of primary web 6 fed to each of the pendulum conveyors 8', 8" can be adjusted so that the mineral fibres can be distributed onto the two production lines according to the demand on these production lines.

In the figures the turning station 7 includes an entry conveyor 72 that is shiftable underneath the feeding conveyor 5a. In an alternative embodiment the entry conveyor 72 is replaced by entry rollers (not shown) operating in the same manner as the entry conveyor.

The invention claimed is:

1. A method of making mineral fibre products, comprising the steps of:
   providing an incoming primary web of mineral wool;
   dividing the incoming primary web longitudinally into a first primary web and a second primary web for feeding a first production line and a second production line; and
   sideway adjusting the width of the first and second primary webs during the production in such a manner that the first and second primary webs, directly after division are fed to a fixed first primary web conveyor at the first production line and to a fixed second primary web conveyor at the second production line, respectively;

wherein the sideway adjusting of the primary web includes a turning table and a receiving conveyor that are sideways adjustable in relation to the fixed first primary web conveyor and the fixed second primary web conveyor, respectively.

2. A method according to claim 1, wherein the dividing of the primary web is performed in a station for shifting a first direction of travel of the primary web by receiving the primary web on the turning table and then transferring the primary web onto the receiving conveyor, where the receiving conveyor has a second direction of travel different from the first direction of travel.

3. A method according to claim 2, wherein the division of the primary web is carried out by a web splitter provided at the downstream end of said receiving conveyor for dividing the incoming primary web into a first primary web and second primary web wherein the turning table is shiftable in the first direction of travel.

4. A method according to claim 1, wherein said first and second primary webs are conveyed into a first pendulum conveyor and a second pendulum conveyor, respectively, on each of the production lines.

5. A method according to claim 1, wherein a base layer is produced on the first production line and a top layer is produced on the second production line.

6. A method according to claim 5, whereby the base layer and the top layer are joined together in a dual density product produced by running the two mineral fibre production lines in parallel.

7. A method according to claim 1, comprising the step of controlling the division and thereby controlling mass distribution of mineral fibre material between the first and second primary web in the station in accordance with the demand for mineral fibre material on the two production lines.

8. A method of making mineral fibre products, comprising the steps of providing an incoming primary web of mineral wool;

dividing the incoming primary web longitudinally into a first primary web and a second primary web for feeding a first production line and a second production line; and adjusting the width of the first and second primary webs during the production in accordance with production demand on said first and second production lines, wherein a base layer is produced on the first production line and a top layer is produced on the second production line, wherein the first production line producing the base layer cures the first primary web.

9. A method according to claim 8, in which after the first production line produces a cured base core layer and the second production line produces an uncured top layer, the cured base layer and the uncured top layer are joined to a laminated product after which the laminated product is cured.

10. A method according to claim 8, wherein the first production line producing the base layer further changes the fibre orientation on the first web.

* * * * *